United States Patent [19]
Huber

[11] 3,933,062
[45] Jan. 20, 1976

[54] SOUND DEADENING MEANS FOR SCREW MACHINE

[76] Inventor: Harold J. Huber, 7625 Payne, Dearborn, Mich. 48126

[22] Filed: Aug. 2, 1974

[21] Appl. No.: 494,096

[52] U.S. Cl. .............................................. 82/38 A
[51] Int. Cl.² ........................................ B23B 25/00
[58] Field of Search ................................... 82/38 A

[56] References Cited
UNITED STATES PATENTS

| | | | |
|---|---|---|---|
| 1,935,999 | 11/1933 | Tessky | 82/38 A |
| 3,828,630 | 8/1974 | Argereu | 82/38 A |

Primary Examiner—Leonidas Vlachos
Attorney, Agent, or Firm—Whittemore, Hulbert & Belknap

[57] ABSTRACT

Plastic ring-like members are press-fitted over elongated work stock members to be fed into a screw machine for operation thereon by the screw machine. The elongated work stock members with attached plastic ring-like elements are received in stock tubes associated with a screw machine. The ring-like members rotate with the work stock members within the stock tubes and function as sound deadening means preventing rattling and scraping of the work stock members within the stock tubes. Additionally, the ring-like members reduce damage to the work stock members, stock tubes and screw machine.

1 Claim, 6 Drawing Figures

U.S. Patent  Jan. 20, 1976  3,933,062
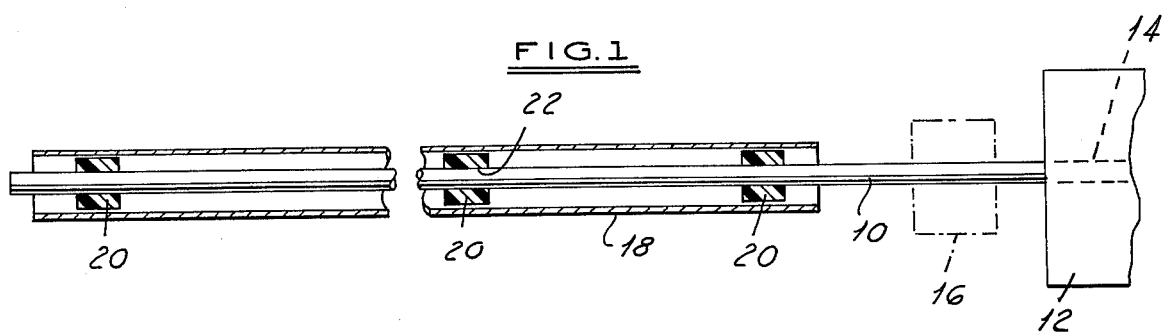
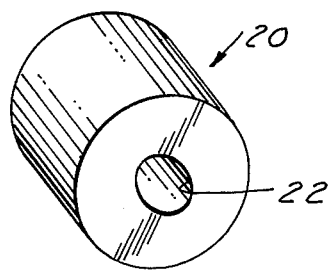
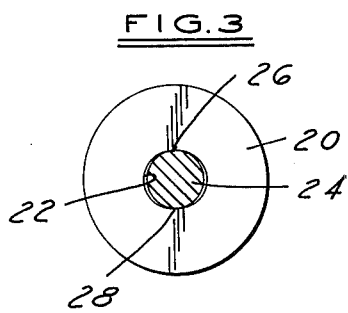
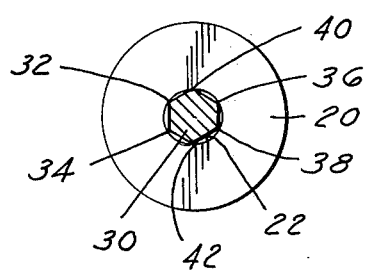
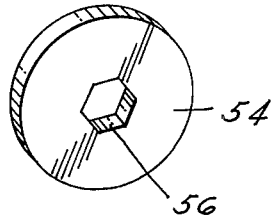
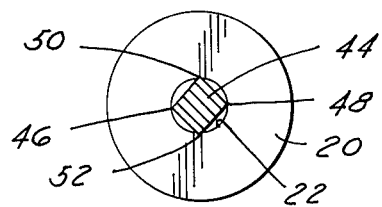

3,933,062

SOUND DEADENING MEANS FOR SCREW MACHINE

BACKGROUND OF THE INVENTION

Screw machines may have a number of spindles, as from one to eight. These machines perform a plurality of operations such as drilling, threading, reaming, knurling, and slotting on elongated work stock. The elongated work stock extends outside of the screw machine into work stock tubes which support the portion of the work stock which is not being operated upon by the screw machine. Only the inner end portion of the work stock is worked upon at a given time. When all of the operations have been finished on this inner end portion, the finished portion is cut off. A feed mechanism then draws the work stock further into the machine whereupon the operations are repeated on a new portion of the work stock. In a multiple spindle machine, several operating stations are provided for simultaneous work on a plurality of work stock members. In operation of a screw machine, the work stock rotates.

Conventionally, in a multiple spindle automatic screw machine, the work stock tubes are cylindrical members which are supported in angularly spaced relation by means of supporting plates. These tubes have an inner diameter capable of receiving and supporting the largest diameter work stock which the particular screw machine is capable of working upon. However, smaller diameter work stock is also receivable in such tubes, screw machines being capable of operating on work stock from a maximum to a minimum diameter. The forward end of the work stock is held by means of collet chucks. The work stock rotates at high speed in the work stock tubes. The work stock tends to rattle and bump against the inner surface of the work stock tubes thereby creating considerable noise. Additionally, wear and damage may be caused to the screw machine, work stock tubes and work stock as a consequence of this contact between the work stock and the inner surface of the work stock tubes.

The noise and wear problems, above mentioned, have been a long standing problem in connection with the operation of screw machines. Various proposals have been made in the past for minimizing this problem. For example, metal sleeves or bushings have been attached to the work stock by means of set screws. The work stock tubes have been lined with plastic stock tube liners. The work stock tubes have been wrapped externally to reduce vibration and muffle sounds. Other techniques have been proposed, as for example, in U.S. Pat. Nos. 1,786,876; 2,534,811; and 3,022,691. The various techniques used in the past have not been entirely satisfactory. For example, use of plastic stock tube liners, while effective, is very expensive. Others of the method have had the disadvantage of not reducing the noise level to the desired threshold. Still others have not functioned satisfactorily because of additional frictional drag which has been placed upon the screw machine.

Recently, it has become necessary for most machine shops using screw machines to suppress noise in some fashion as a consequence of regulations promulgated by the federal agency responsible for implementation of the Occupational Safety and Health Act of 1970, commonly referred to as O.S.H.A. Regulations promulgated by O.S.H.A. are being enforced. Machine shops, particularly small machine shops, have encountered difficulty in following such regulations because of the high cost involved.

In accordance with the present invention, plastic ring-like members are provided for press-fitting onto work stock. These plastic ring-like members may be supplied in various diameters with different center hole sizes for use on different sized screw machines and different sized work stock. In operation, the ring-like members are automatically removed form the work stock by abutment against screw machine structure during operation of the screw machine. Furthermore, the ring-like members are relatively inexpensive and, being fabricated of plastic, cause minimal damage if inadvertently engaged by working parts of the screw machine. Further, the ring-like members are believed to reduce the noise level of screw machines sufficiently to meet the current requirements of O.S.H.A.

SUMMARY OF THE INVENTION

Means and method are provided for deadening sound during operation of a screw machine of the type which includes at least one elongated work stock tube which normally receives and supports an elongated work stock member for feeding into the screw machine. A ring-like member is provided for press-fitting onto the elongated work stock member. The ringlike member is fabricated of a plastic material and has a central opening therethrough. This opening is preferably oval in cross-section. The ring-like member preferably has a relatively long axial dimension with reference to the outside diameter thereof. In the method of use of the ring-like member, at least one ring-like member is press-fitted onto an elongated work stock member adjacent one end thereof. The work stock member is placed into a work stock tube with the ring-like member located in the tube. The other end of the work stock member is operatively connected with the screw machine. Successive portions of the work stock member are then machined in the screw machine while rotating the work stock member in the work stock tube. The ring-like member prevents contact of the work stock member with the inner surface of the work stock tube. The work stock member is drawn into the screw machine as work is completed on successive portions of the work stock member. Ultimately, the ring-like member is abutted against fixed structure and drives off the work stock member when the work stock member has been reduced to a relatively short length. In some cases, at least two ring-like members are press-fitted onto the work stock member at spaced apart locations to provide additional support.

IN THE DRAWINGS

FIG. 1 is a side elevational view illustrating the ring-like members of the present invention applied to a work stock member shown in operative relationship to a screw machine;

FIG. 2 is a view in perspective of one embodiment of a ring-like member in accordance with the present invention;

FIG. 3 is an end view of the ring-like member of FIG. 2 illustratively mounted upon a cylindrical work stock member;

FIG. 4 is an end view of the ring-like member of FIG. 2 illustratively mounted upon a work stock member having an hexagonal cross-section;

FIG. 5 is a view in perspective of a ring-like member wherein the center opening has an hexagonal shape to receive a work stock member having an hexagonal configuration; and FIG. 6 is an end view of the ring-like member of FIG. 2 illustratively mounted on a work stock member having a square cross-section.

Referring to FIG. 1, a work stock member 10 is mounted in a screw machine 12 to be acted thereon. The work stock member 10 is an elongated piece of stock. The inner end portion 14 is machined by the screw machine. The machining operations are, for example, drilling, threading, reaming, knurling, slotting and the like. The specific machine operations performed on the work are predetermined during set-up of the machine. Screw machines come in various configurations ranging from a single spindle device to devices having a multiplicity of spindles for simultaneous operations on a plurality of workpieces. After completion of the machining operations, the forward end of the work stock member is normally severed from the remaining portion of the stock. A new end portion is then fed into the screw machine by means of a feed mechanism 16 which is illustrated diagrammetically. Various machines have differently designed feed mechanisms. The present invention will work in conjunction with any of the variety of screw machines which are extant. Operation of the invention does not depend upon the design of a particular screw machine inasmuch as the invention does not alter the functional characteristics of the machine.

The work stock member 10 is originally an elongated piece of stock. The stock may be of various cross-sectional configurations. Conventionally, such stock has a cross-section which is circular, hexagonal or square. However, the invention will function satisfactorily on other non-conventional shapes inasmuch as operation of the invention does not depend upon the cross-section of the work.

The work stock member extends into an elongated work stock tube 18. The tube 18 is supported adjacent to the screw machine 12. In the case of a single spindle screw machine, only one tube 18 is provided. However, in the case of the multiple spindle screw machine, there are as many tubes 18 as there are spindles. Six, eight or more spindles may be provided. The bank of tubes 18 is adapted to be indexed to different operating stations of the screw machine. Such indexing is also accomplished with a single spindle machine. The advantage of a multiple spindle machine is that more than one workpiece may be operated upon during the work cycle of the machine.

As it will be noted in FIG. 1, three ring-like plastic members 20 are mounted on the member 10 at spaced apart locations. The members 20 have an outer diameter which is slightly less than the inner diameter of the tube 18 so that they will not form a drag on the machine during operation of the machine. In operation of a screw machine, the work is rotated rapidly during machining operations. The members 20 rotate along with the work and if strong frictional engagement were made with the inner surface of the tube 18, a frictional drag would result which could be detrimental to functioning of the machine. However, it will be appreciated that the work stock member 10 is not free to move any considerable distance in the radial direction within the tube 18. Thus, the work stock member 10 does not contact the inner surface of the tube 18 and cause a noise problem or damage to the tube or work.

As it will be appreciated from viewing FIG. 1, the outer diameter of the work stock member 10 is considerably less than the inner diameter of the tube 18. Therefore, without provision of the members 20, the work stock member would be free to move around within the tube 18 and cause the noise and damage previously referred to. The number of members 20 provided on a particular length of work depends to some extent upon the relative diameter and weight and strength of the work. For example, wire size work (which is defined as a work member which has a diameter less than 25% of the machine capacity, i.e., in a one-inch machine, wire stock sizes are one-quarter inch (¼ inch) or less) bends more easily than larger diameter stock and therefore it is desirable to place additional members 20 along the length of the stock. If the stock is of larger diameter, it will bend less easily and in some cases it is necessary to provide only one of the members 20 at the outer end of the stock adjacent the outer end of the tube 18.

As the work stock member 10 is drawn into the screw machine 12 as a consequence of completed machining operations on successive inner end portions of the member 10, the members 20 eventually abut against structure of the screw machine and are driven back on the member 10. As the last portion of member 10 is drawn into the machine 12 the members 20 are forced off the end of the member 10 and fall towards the ground. Depending upon the structure of the machine 12, these members may be caught in a sump provided on the underside of many screw machines, they may fall to the floor or a basket or the like may be provided to catch them. In a particular screw machine, if normal structure of the screw machine does not provide a convenient abutment surface to drive the members 20 back on the member 10, ancillary structure may be secured to the screw machine for this purpose. However, the majority of screw machines have available structure which adequately serves the purpose.

The ring-like member 20 is illustrated in FIG. 2. As it will be noted, the member 20 is a bushing-like relatively long cylindrical member. It is fabricated of a plastic, preferably a relatively soft plastic. The material may be, for example, polyethylene. However, other plastics such as nylon, and the like are suitable for the invention. A central opening 22 is provided through the member 20. The opening 22 is preferably oval in cross-section, a 60° ellipse being illustrated. The purpose of the ellipse is to permit the member 20 to accommodate differently configured work stock members as, for example, cylindrical, hexagonal and square stock members.

FIGS. 3, 4 and 6 illustrate the manner in which the member 20 may be used upon differently configured work stock cross-sections. In FIG. 3, the work stock member 24 has a circular cross-section. The member 20 is forced onto the member 24 as by a press-fit. The short diameter of the opening 22 is somewhat less than the diameter of the stock member 24 thereby insuring frictional engagement at points 26, 28. This is sufficient to hold the member 20 on the member 24 during the machining operation.

FIG. 4 illustrates the member 20 press-fitted onto a work stock member 30 which has an hexagonal cross-section. The points 32, 34, 36, 38 engage the opening 22 with a frictional engagement. However, the points 40, 42 of the member 30 define a diameter which is larger than the short diameter of the opening 22. These points actually cut small grooves in the inner surface to thereby provide a relatively positive engagement of the member 20 with member 30.

Referring to FIG. 6, it will be noted that the member 20 is press fitted onto a work stock member 44 which has a square cross-sectional configuration. Again, points 46, 48, frictionally engage the opening along the long diameter thereof. Points 50, 52, cut shallow grooves into the surface at points defined by the ends of the short diameter of the ellipse. Thus, again, a relatively positive connection between the member 20 and member 44 is provided.

FIG. 5 illustrates another embodiment of the invention. In FIG. 5, the ring-like member 54 is a relatively thin disc as opposed to the cylindrical member 20 having a relatively long axial dimension. The FIG. 5 embodiment is also modified in that opening 56 is hexagonal in shape for reception on a hexagonal stock member. It has been found that while relatively thin discs such as the member 54 do operate satisfactorily, longer axis cylindrical members such as the member 20 are preferred. As it will be appreciated, the ring-like members may be provided with different exterior and interior diameters to fit work stock tubes having different inner diameters and to fit work stock members having different outside diameters. The use of the ellipse as in the member 20 is advantageous in that this member is capable of being used on at least three different configured work stock members. For example, a member 20 in which the short diameter of the opening 22 is 0.480 inch is receivable on a work stock member having a circular cross-section of ½ inch, a work stock member having an hexagonal cross-section measuring 7/16 inch between oppositely disposed flats, and a work stock member having a square configuration measuring ⅜ inch between two oppositely disposed sides.

Having thus described my invention. I claim:

1. The combination comprising an elongated work stock member for feeding into a screw machine, an elongated work stock tube receiving said elongated work stock member, and at least one ring-like member press-fitted onto said work stock member, said ring-like member being fabricated of a plastic material and having a central opening therethrough, said central opening being oval in cross-section, said ring-like member being located at a point remote from the end of the work stock member which is to be operated upon by a screw machine, said ring-like member further being located within said work stock tube.

* * * * *